Nov. 24, 1964        A. P. RINFRET ETAL        3,158,283
        CORRUGATED CONTAINER FOR THE LOW TEMPERATURE
              PRESERVATION OF BIOLOGICAL SUBSTANCES
Filed April 24, 1961                           2 Sheets-Sheet 1

INVENTORS
ARTHUR P. RINFRET
CLEMENT W. COWLEY

BY William F. Mesinger
ATTORNEY

Nov. 24, 1964         A. P. RINFRET ETAL         3,158,283
       CORRUGATED CONTAINER FOR THE LOW TEMPERATURE
              PRESERVATION OF BIOLOGICAL SUBSTANCES
Filed April 24, 1961                          2 Sheets-Sheet 2

INVENTORS.
ARTHUR P. RINFRET
CLEMENT W. COWLEY

BY *William H. Mesinger*
ATTORNEY

United States Patent Office 3,158,283
Patented Nov. 24, 1964

3,158,283
CORRUGATED CONTAINER FOR THE LOW TEMPERATURE PRESERVATION OF BIOLOGICAL SUBSTANCES
Arthur P. Rinfret, Buffalo, and Clement W. Cowley, Tonawanda, N.Y., assignors to Union Carbide Corporation, a corporation of New York
Filed Apr. 24, 1961, Ser. No. 105,190
10 Claims. (Cl. 220—64)

This invention relates to the art of low temperature preservation of biological substances. More particularly, this invention relates to a container for rapid cooling, storage and rapid warming of biological substances such as blood, bone marrow, other suspensions of cells and biological fluids.

The preservation of biological substances from degradation on storing has been a constant problem facing scientists. The problem has been especially acute in the case of blood. The maintenance of blood banks and the desirability of storing whole blood as well as other physiologically important substances in quantities for use in the event of catastrophe has made imperative the need for sterile, efficient containers suitable for freezing, storage, and thawing of these substances.

It has been postulated that suitable long term storage may be achieved at temperatures sufficiently low to inhibit biological and chemical activity of the substance stored. Such low temperature storage, however, presents a large number of problems among which are provisions for favorable heat transfer characteristics, ease of sterilization and recovery of essentially undamaged contents after storage. Furthermore, the materials of construction for such containers are limited to those that are easily sterilizable, capable of maintaining sterility, and that are non-toxic to the biological substances stored.

It is the principal object of this invention to provide an improved and novel container for the low temperature preservation of biological substances, such as whole blood, virus preparations, bone marrow and the like.

Another object of this invention is to provide a container for the low temperature preservation of biological substances which provides favorable heat transfer characteristics, is easily sterilizable, and provides for the recovery of essentially undamaged contents after storage.

Other objects and advantages will be evident from the ensuing description and drawings in which.

Figure 1:
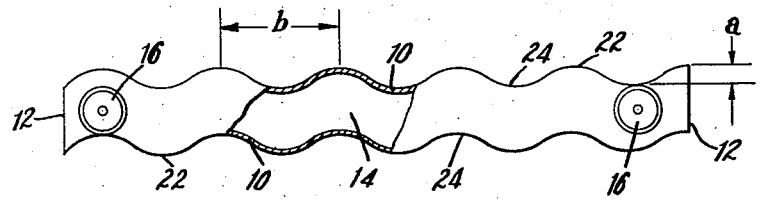
FIG. 1 is a top view of a preferred container of this invention having sinusoidal type corrugations.
Figure 2:
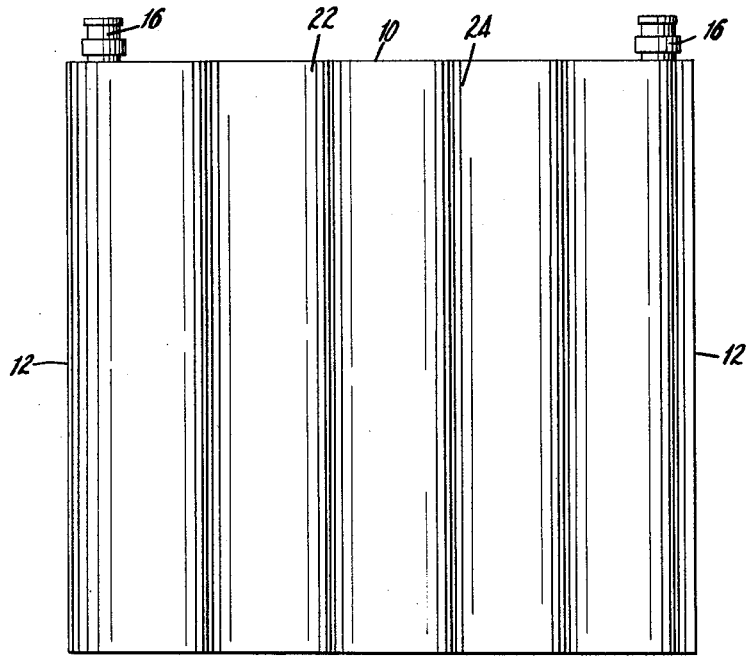
FIG. 2 is a front view of the container of FIG. 1.

According to the present invention, a container for the low temperature preservation of biological substances is provided. The container comprises at least two corrugated walls arranged and positioned in parallel relationship and being joined by other walls at their opposing ends so as to form an enclosed space between the corrugated walls for storing the biological substances. Sterile openings are provided in the space so formed for the passage of the biological substances therethrough.

In the case of whole blood preservation, for example, the heat transfer characteristics must be such that the whole blood contained within the container can be chilled and warmed through the critical region between about 0° C. and about −50° C. in a very short time period, usually of the order of about 10 seconds. Furthermore, the containers must be such that at least 70% of the stored red blood cells can be recovered after storage using common blood storage additives such as lactose, polyvinylpyrrolidone (PVP), acid citrate-dextrose (ACD), and the like.

Very favorable heat transfer characteristics during freezing and subsequent thawing are achieved by initially freezing the blood in shell form within the storage container. Such freezing provides the maximum utilization of the available container heat transfer area irrespective of the degree of filling of the container since a shell which comprises the frozen blood is formed over the entire inside wall surface of the storage container. Different degrees of filling the container with the biological substance may be preferred depending on the preferred shell thickness and specific biological considerations in each application.

A frozen shell within the container is most conveniently formed by shaking a partly filled container during immersion of the container in the refrigerant bath. The thickness of the shell formed is a function of the available surface area of the container employed and the volumetric amount of blood or other biological substance placed within the container. The maximum permissible shell thickness for a frozen biological substance is a function of its heat conductivity characteristics. In order to obtain a red blood cell recovery of about 85 to 90% after chilling whole blood in admixture with blood additives such as lactose, glucose, and the like, and a suitable anticoagulant, it is necessary to maintain a cooling rate of at least about 10° C. per second after the phase change and while in the temperature range between about 0° C. and −50° C. This means that the frozen blood shell thickness within the container should not exceed about 5 mm. Similarly, if the desired cooling rate is known for any other particular biological substance, the maximum permissible shell thickness can be determined.

An important advantage of freezing the biological substance so as to form a shell within the container is the achievement of nearly uniform cooling and warming rates for the entire bulk of the frozen biological substance. The thinner the frozen shell, the smaller is the temperature gradient across the shell during freezing and thawing.

We have discovered that in order to further enhance heat transfer characteristics during the freezing and thawing of biological substances it is desirable for the container to have:

(a) A relatively high ratio of heat transfer surface area to the volume of biological substance frozen.
(b) Such physical dimensions that provide for the formation of a uniform, relatively thin shell upon freezing and effective heat transfer during thawing.

We have found that the corrugated container of the present invention satisfies the physical requirements aboveoutlined. In the preferred embodiment of this invention, the corrugations of each wall are constructed so as to have a uniform pitch and depth and arranged so that the peak corrugations of one wall align with the trough corrugations of the opposite parallel wall. Because the corrugations are aligned peak to trough, a minimum restriction to the flow of liquid is present within the container during shaking even though the direction of flow is constantly being changed. When the container is immersed in a refrigerant bath and shaken, the corrugations will act as baffles directing the biological substances therein against all the heat transfer surfaces. This baffling action results in a uniform distribution of the biological substances over the freezing surfaces and therefore a most efficient use of such surfaces. Moreover, we have found that shaking frequency and amplitude are less critical during the shell formation if a container having a peak to trough alignment is employed.

We have further discovered that the corrugation pitch and corrugation depth become important in producing a uniform frozen shell. Corrugation pitch is defined herein as the distance between successive peaks in a corrugated wall. Corrugation depth is defined herein as the distance between a peak and a trough in a corrugated wall. In order to achieve a relatively uniform shell, a corrugation pitch of at least about 5/8 of an inch and a corrugation depth of less than about 3/8 of an inch is preferred. At corrugation pitches less than about 5/8 of an inch or corrugation depths greater than about 3/8 of an inch, the frozen shell formed has not been substantially uniform but has been found to be wider around the peak areas of the corrugation and narrower around the trough areas.

The corrugations may be of the "saw-tooth" type or a smooth sinusoidal type of curve. It has been found that the smooth sinusoidal type of corrugations provide the most uniform shell thickness.

The container thickness, i.e., the cross-sectional distance between the two corrugated walls, is limited by the physical limitation of the shaking apparatus and by the particular shell thickness desired. A satisfactory cross-sectional thickness of the containers of this invention ranges between about 3/4 of an inch and about 2 inches. The preferred container cross-sectional thickness or width from a handling and storage viewpoint is about 1 inch.

We have found that in order to obtain adequate agitation through shaking the container during freezing and thawing, the volume of the biological substance inside the container must be no greater than about 60% of the total container volume. As discussed previously, the heat transfer surface area to volume of biological substance ratio should be as high as possible. In a given container, a reduction of filling will increase this ratio. However, a smaller volume or filling will increase the void space of the frozen container. By void space is meant the cross-sectional distance between the frozen biological substance shells on opposing walls. This increased void space results in a considerable increase in the degree of foaming during shaking within the blood before freezing and shell formation is complete. Air entrainment in the freezing blood mixture causes a decrease in heat removal and therefore sets a minimum filling level for the container. The preferred filling level for the present container is between about 40 and 60 percent.

Figure 3:
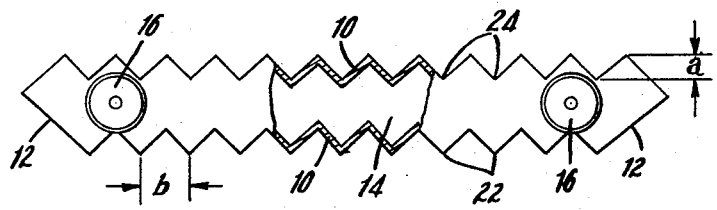
FIG. 3 is a top view of a preferred container of this invention having saw tooth type corrugations.

Referring now more specifically to FIGS. 1, 2, 3 and 4, containers for the preservation of biological substances are illustrated. The containers comprise two corrugated walls 10 having corrugations, of which those shown in FIG. 1 are of the sinusoidal type and those shown in FIG. 3 are of the saw tooth type. The two corrugated walls 10 are in parallel relationship and are joined by walls 12 so as to define an enclosed storage storage space 14 for the biological substances. The corrugations of one wall are arranged so that the peaks 22 of the corrugations of one wall are aligned with the troughs 24 of the corrugations of the other wall. Opening means 16 are provided to communicate with space 14 for filling and emptying the container. The corrugation depth of the container is measured at "a" and the corrugation pitch is measured at "b."

Figure 4:
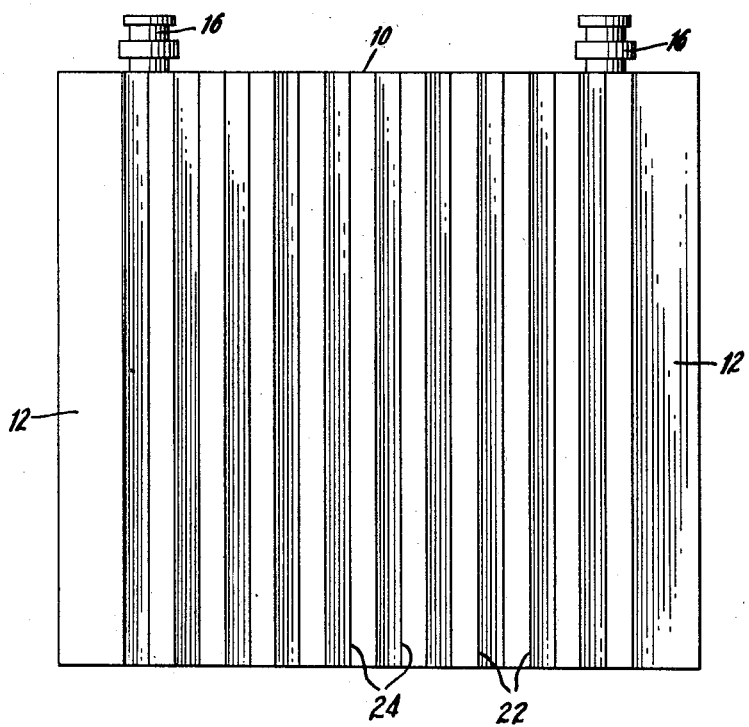
FIG. 4 is a front view of the container of FIG. 3.
Figure 5:
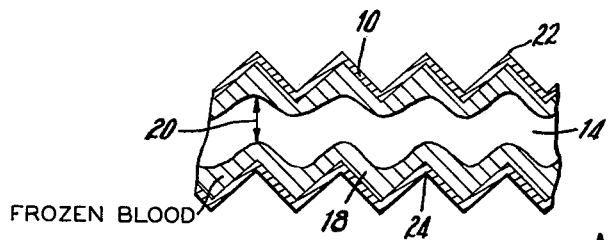
FIG. 5 is a horizontal sectional view of the container of FIGS. 3 and 4 after having the biological substance frozen therein.

Referring now more specifically to FIG. 5, a horizontal sectional view of the container of FIGS. 3 and 4 is shown after the container had been partially filled with whole blood and additives and then shaken after immersion in a liquid refrigerant such as liquid nitrogen. The container formed a substantially uniform shall 18 in the storage space 14 and against the corrugated walls 10. A central void space 20 formed between the shells 18 of each corrugated wall 10.

It has been discovered that suitable materials of construction for the containers are those providing a $K/L$ value of at least 2500, wherein K is the thermal conductivity in B.t.u./(hr.) (ft.) (° F.) and L is the material thickness expressed in feet. If the $K/L$ value is less than 2500, heat cannot be introduced or removed through the container walls at a sufficiently fast rate to prevent the deterioration of the biological substances. This is of paramount importance for the low temperature preservation of whole blood.

The construction material must not only provide the required $K/L$ value but, in addition, must be non-toxic to the biological substances. The order or preference of the commonly available materials is magnesium, aluminum, and stainless steel. Magnesium and aluminum give essentially the same results, while stainless steel is slightly inferior, although not significantly so. Copper also has been tried, but was shown to be toxic. Moreover, nonmetals such as plastics may be used as materials of construction provided the general requirements of rigidity, sterility, heat transfer characteristics, and the like, as herein disclosed, are satisfied. For metallic containers, wall thicknesses of from about 0.007 to about 0.050 inch have been successfully used. However, it must be understood that the minimum thickness capable of providing satisfactory structural rigidity is preferred since this provides the highest $K/L$ value.

In the present invention for the preservation of bulk quantities of biological substances heat must be transferred through the solid walls of the storing-container to a boiling refrigerant. In addition to the proper choice of materials of construction, the rate of heat transfer may be increased manyfold by altering the temperature difference so as to place the system in an unstable or nucleate boiling region. This object is accomplished by interposing between a solid and a liquid at its boiling point, a material of sufficiently low thermal conductivity to adjust the change in temperature between the boiling surface and the liquid to a value which allows a greater heat transfer rate. The solid is desirably a metal and preferably a highly conductive metal so that the resistance to heat flow through the mass of a separating wall will be minimized.

The insulating material may be any substance which is chemically and thermally stable in the temperature range employed, and which has a lower thermal conductivity than the storing container material. The thermal conductivity of the insulating material is preferably below about 0.15 B.t.u./(hr.) (ft.) (° F.). The insulating material should be of sufficient thickness to adjust the change in temperature between the boiling surface and the saturation temperature of the liquid refrigerant to a point where more efficient heat transfer will occur. The thickness of the insulating film necessary to adjust the change in temperature between the boiling surface and the liquid refrigerant to the most efficient value is a function of its thermal conductivity and thickness and conductivity of the container wall, and the boiling characteristics of the liquid refrigerant.

To illustrate the effect of thin, insulating coatings on boiling from a solid under unsteady state conditions, aluminum cylinders 3/8 inch in diameter and 1 inch long were suddenly submerged in liquid nitrogen boiling at about −196° C. (−320° F.) with and without insulating coatings. A thermocouple was placed in the center of the aluminum cylinder and attached to a temperature recorder which recorded the temperature at the axis as a function of time. The time required to cool the aluminum cylinders from 25° C. to −196° C. was recorded. The bare cylinder required about 55 seconds to cool from 25° C. to −196° C., whereas only about 14 seconds were required to cool an identical cylinder insulated with a 0.10 mm. thickness of petroleum paraffin base.

Other insulating film coatings were applied to the aluminum cylinders and the time required to cool from 25° C. to about −196° C. in boiling liquid nitrogen recorded. The results of these experiments are shown in Table II.

TABLE II

*Time Required to Cool 3/8 in. Diameter and 1.0 in. Long Aluminum Cylinder from 25° C. to −196° C.*

| | Cooling period, sec. |
|---|---|
| (1) Bare cylinder | 55 |
| (2) Knurled cylinder, no coating | 40 |
| (3) "Poxalloy" additive, 0.05 mm. | 40 |
| (4) "Poxalloy" adhesive, 0.23 mm. | 28 |
| (5) "Poxalloy" adhesive, 0.75 mm. | 25 |
| (6) Clear varnish, 0.04 mm. | 29 |
| (7) Clear varnish, 0.10 mm. | 20 |
| (8) Vulcanized rubber, 0.04 mm. | 26 |
| (9) Vulcanized rubber, 0.23 mm. | 15 |
| (10) House paraffin, 0.025 mm. | 36 |
| (11) House paraffin, 0.27 mm. | 23 |
| (12) House paraffin, 0.34 mm. | 26 |
| (13) Rubber paraffin, 0.028 mm. | 38 |
| (14) Rubber paraffin, 0.28 mm. | 17 |
| (15) Rubber paraffin, 0.39 in. | 19 |
| (16) Paper masking tape, 0.30 mm. | 19 |
| (17) Paper masking tape, 0.60 mm. | 32 |
| (18) Paper masking tape, 0.90 mm. | 38 |
| (19) Rubber electrician's tape, 0.16 mm. | 18 |
| (20) Rubber electrician's tape, 0.33 mm. | 26 |
| (21) Rubber electrician's tape, 0.50 mm. | 32 |
| (22) Vaseline, 0.01 mm. | 36 |
| (23) Vaseline, 0.025 mm. | 24 |
| (24) Vaseline, 0.05 mm. | 21 |
| (25) Vaseline, 0.10 mm. | 14 |
| (26) Vaseline, 0.15 mm. | 13.5 |
| (27) Vaseline, 0.20 mm. | 14 |
| (28) Vaseline, 0.25 mm. | 16 |
| (29) Vaseline, 0.37 mm. | 17 |
| (30) Vaseline, 0.45 mm. | 20 |
| (31) Asbestos, 0.25 mm. | 42 |
| (32) Asbestos, 0.95 mm. | 64 |
| (33) Sodium silicate, 0.11 mm. | 33 |
| (34) Sodium silicate, 0.17 mm. | 30 |
| (35) Kaolin, 0.11 mm. | 38 |
| (36) Plaster of Paris, 0.19 mm. | 10 |

The rapid chilling of the biological substances is achieved by immersing the containers in a cryogenic, fluid bath. The fluid suitable for use in the present invention must be cold enough to freeze the biological substance and, of course, provide a temperature differential between the biological substance and the heat transfer surfaces compatible with the desired heat transfer rates. In the case of blood, for example, this means that the refrigerant must have a temperature of below about −120° C. to insure adequate recovery of the red blood cells.

Liquid nitrogen is the preferred refrigerant, since it has the advantage of being relatively inert, safe to handle, and relatively inexpensive. It also has an extremely low boiling point, namely, −196° C., at atmospheric pressure. However, other liquid refrigerants may also be used. Among those suitable are liquid air, liquid helium, liquid neon, liquid argon, liquid krypton, saturated solution of Dry Ice in methyl alcohol and the like.

Liquid nitrogen and the other low-boiling refrigerants are saturated fluids at atmospheric pressure, and boil violently when a warm object such as the blood-storing container is plunged therein. The heat transfer is dependent upon the temperature difference, $\Delta T$, between the fluid and the warm object. At very high values of $\Delta T$, a vapor film is formed around the warm container resulting in very poor heat transfer. This vapor film becomes less and less stable as the $\Delta T$ is decreased and the heat transfer improved. At a $\Delta T$ of about 3° C. (for liquid nitrogen), maximum heat transfer is attained and drops off as the $\Delta T$ is reduced to zero. In view of this heat transfer rate $\Delta T$ pattern, it would appear that a prohibitively low heat transfer rate would be attained when a blood storing container at 25° C. is suddenly plunged into liquid nitrogen at −196° C. However, the application of the aforedescribed coatings on the container outer walls allow the surface in contact with the liquid nitrogen to be cooled very rapidly and provide a $\Delta T$ value closer to 3° C.

In order to thaw a container of frozen blood, it is necessary to again pass through the critical temperature region from −50° C. to melting as rapidly as possible. Unfortunately there is an added limitation in that blood is rapidly and irreversibly damaged at temperatures higher than 50° C. Thus the temperature of the fluid used to perform the thawing function should not be substantially higher than this value. Water is the preferred thawing medium, but other methods such as thawing by means of radio frequency energy are also feasible.

EXAMPLE I

In an example of the invention, experimental results obtained in freezing 293 cc. of whole blood are compiled in Table III. The container had a height of 16 cm., a length of 18 cm. and a cross-sectional thickness of 25 mm. The two opposing and largest walls of the container had corrugations of the "saw tooth" type and were asymmetrically arranged. Each wall had a corrugation pitch of 16 mm. and a corrugation depth of 6.5 mm. The container was coated with a 50% Glycerol/Methanol-Santocel "54" coating.

The container was filled with 293 cc. of whole blood and protective additives and immersed in a liquid nitrogen bath and shaken. The container was shaken at 200 cycles/min. at an amplitude of 5 inches for 45 seconds. The container was thawed by immersing the container in a water bath at a temperature of 45° C. and shaken at 200 cycles/min. at an amplitude of 5 inches for 45 seconds. The red blood cell recovery is shown in the following table for 5 separate runs.

TABLE III

| Run | Red blood cell recovery, percent |
|---|---|
| 1 | 95.0 |
| 2 | 94.0 |
| 3 | 95.3 |
| 4 | 94.9 |
| 5 | 95.2 |

EXAMPLE II

In another example of the invention, experimental results in freezing 465 cc. and 490 cc. of whole blood in a sinusoidal type corrugated container are compiled in Table IV. The container used for freezing 465 cc. of whole blood had a height of 9 inches, a length of 8¼ inches and a uniform cross-sectional thickness of ¾ of an inch. The 490 cc. of whole blood were frozen in a container having the same length and height as the 465 cc. freezing but having a cross-sectional thickness of 15/16 of an inch. The two opposing and largest walls of the container had "sinusoidal type" corrugations and were asymmetrically arranged. Each wall had a corrugation pitch of 1¼ inches and a corrugation depth of ¼ of an inch. Both containers were coated with a 50% Glycerol/Methanol-Santocel "54" Coating.

The freezing process was similar to that used in Example I and the red blood cell recovery was as follows:

TABLE IV

| Run No. | Volume Frozen (cc.) | Age of Blood (days) | Red Cell Recovery (percent) |
| --- | --- | --- | --- |
| 1 | 465 | 0 | 89.9 |
| 2 | 465 | 3 | 85.8 |
| 3 | 465 | 13 | 84.5 |
| 4 | 465 | 13 | 83.3 |
| 5 | 465 | 0 | 90.2 |
| 6 | 465 | 0 | 86.2 |
| 7 | 465 | 0 | 89.8 |
| 8 | 465 | 0 | 91.2 |
| 9 | 490 | 0 | 88.9 |
| 10 | 490 | 1 | 90.1 |
| 11 | 490 | 1 | 84.2 |
| 12 | 490 | 1 | 87.0 |

What is claimed is:

1. A storage container for the low temperature freeze preservation of biological substances by indirect heat exchange with a heat transfer fluid which comprises at least two corrugated walls arranged and positioned in parallel relationship and being joined at their opposing ends by other walls of sufficient width so as to form an enclosed space between said corrugated walls for storing said biological substances, the peaks of the corrugations of one wall being aligned with the troughs of the corrugations of the opposing parallel wall; sterile opening means communicating with said enclosed space for filling and emptying said container; said container walls being constructed of a material having a $K/L$ value greater than 2500 wherein K is the thermal conductivity of said material in B.t.u./(hr.) (ft.) (° F.) and L is the material thickness in feet.

2. A storage container for the low temperature freeze preservation of biological substances by indirect heat exchange with a heat transfer fluid which comprises at least two corrugated walls arranged and positioned in parallel relationship, said corrugations having a uniform pitch and depth and the peaks of the corrugations of one wall being aligned with the troughs of the corrugations of the opposing parallel wall said corrugated walls being joined at their opposing ends by other walls of sufficient width so as to form an enclosed space between said corrugated walls for storing said biological substances; sterile opening means communicating with said enclosed space for filling an emptying said container; said container walls being constructed of a material having a $K/L$ value greater than 2500 wherein K is the thermal conductivity of said material in B.t.u./(hr.) (ft.) (° F.) and L is the material thickness in feet.

3. A storage container for the low temperature freeze preservation of biological substances by indirect heat exchange with a heat transfer fluid which comprises at least two corrugated walls arranged and positioned in parallel relationship, said corrugations having a uniform pitch of at least about ⅝ of an inch and a uniform depth of less than about ⅜ of an inch and the peaks of the corrugations of one wall being aligned with the troughs of the corrugations of the opposing parallel wall, said corrugated walls being joined at their opposing ends by other walls of sufficient width so as to form an enclosed space between said corrugated walls for storing said biological substances; sterile opening means communicating with said enclosed space for filling and emptying said container; said container walls being constructed of a material having a $K/L$ value greater than 2500 wherein K is the thermal conductivity of said material in B.t.u./(hr.) (ft.) (° F.) and L is the material thickness in feet.

4. A storage container for the low temperature freeze preservation of biological substances by indirect heat exchange with a heat transfer fluid which comprises at least two corrugated walls arranged and positioned in parallel relationship, said corrugations having a uniform pitch and depth and the peaks of the corrugations of one wall being aligned with the troughs of the corrugations of the opposing parallel wall, the two largest opposing parallel corrugated walls being separated by a distance of from about ¾ of an inch to 2 inches and being joined at their opposing ends by other walls of sufficient width so as to form an enclosed space between said corrugated walls for storing said biological substances; sterile opening means communicating with said enclosed space for filling and emptying said container; said container walls being constructed of a material having a $K/L$ value greater than 2500 wherein K is the thermal conductivity of said material in B.t.u./(hr.) (ft.) (° F.) and L is the material thickness in feet.

5. A storage container for the low temperature freeze preservation of biological substances by indirect heat exchange with a heat transfer fluid which comprises at least two corrugated walls arranged and positioned in parallel relationship, said corrugations having a uniform pitch of at least about ⅝ of an inch and a uniform depth of less than about ⅜ of an inch and the peaks of the corrugations of one wall being aligned with the troughs of the corrugations of the opposing parallel walls being separated by a distance of from about ¾ of an inch to 2 inches and being joined at their opposing ends by other walls of sufficient width so as to form an enclosed space between said corrugated walls for storing said biological substances, sterile opening means communicating with said enclosed space for filling and emptying said container; said container walls being constructed of a material having a $K/L$ value greater than 2500 wherein K is the thermal conductivity of said material in B.t.u./(hr.) (ft.) (° F.) and L is the material thickness in feet.

6. A storage container for the low temperature freeze preservation of biological substances by indirect heat exchange with a heat transfer fluid which comprises at least two corrugated walls arranged and positioned in parallel relationship, said corrugations having a uniform pitch of at least about ⅝ of an inch and a uniform depth of less than about ⅜ of an inch and the peaks of the corrugations of one wall being aligned with the troughs of the corrugations of the opposing parallel wall, the two largest opposing parallel corrugated walls being separated by a distance of from about ¾ of an inch to 2 inches and being joined at their opposing ends by other walls of sufficient width so as to form an enclosed space between said corrugated walls for storing said biological substances; said space having an excess volume capacity of from about 40 to about 60 percent of the total amount of said biological substances to be stored therein; sterile opening means communicating with said enclosed space for filling and emptying said container; said container walls being constructed of a material having a $K/L$ value greater than 2500 wherein K is the thermal conductivity of said material in B.t.u./(hr.) (ft.) (° F.) and L is the material thickness in feet.

7. A storage container as described in claim 1 wherein the container is coated with a material having a thermal conductivity below about 0.15 B.t.u./(hr.) (ft.) (° F.).

8. A storage container as described in claim 2 wherein the container is coated with a material having a thermal conductivity below about 015 B.t.u./(hr.) (ft.) (° F.).

9. A storage container as described in claim 5 wherein the container is coated with a material having a thermal conductivity below about 0.15 B.t.u./(hr.) (ft.) (° F.).

10. A storage container as described in claim 6 wherein the container is coated with a material having a thermal conductivity below about 0.15 B.t.u./(hr.) (ft.) (° F.).

References Cited in the file of this patent

UNITED STATES PATENTS

| | | |
|---|---|---|
| 1,288,061 | Leighton | Dec. 17, 1918 |
| 1,690,930 | Forbes | Nov. 6, 1928 |
| 1,943,855 | Carter | Jan. 16, 1934 |
| 2,028,806 | Rechtin | Jan. 28, 1936 |
| 2,209,304 | Alder | July 30, 1940 |
| 2,230,997 | Chambers | Feb. 11, 1941 |
| 2,618,134 | Kaufman | Nov. 18, 1952 |
| 2,618,939 | Morrison | Nov. 25, 1952 |
| 2,655,007 | Lazar | Oct. 13, 1953 |
| 2,722,111 | Taylor | Nov. 1, 1955 |
| 2,875,588 | Berger | Mar. 3, 1959 |
| 2,912,335 | Haller | Nov. 10, 1959 |
| 2,947,155 | Phelan | Aug. 2, 1960 |
| 2,951,351 | Snelling | Sept. 6, 1960 |
| 2,979,920 | Peaks | Apr. 18, 1961 |

FOREIGN PATENTS

| | | |
|---|---|---|
| 798,863 | Great Britain | July 30, 1958 |

OTHER REFERENCES

"The Freezing of Whole Blood" (Merryman), published in volume 13, Research Report, pages 953–964, of the Naval Medical Research Institute (1955), (page 958 relied upon).